(12) United States Patent
Bik (10) Patent No.: US 7,599,427 B2
(45) Date of Patent: Oct. 6, 2009

(54) MICRO RANGE RADIO FREQUENCY (RF) COMMUNICATIONS LINK

(75) Inventor: Tadeusz M. Bik, North Vancouver (CA)

(73) Assignee: Honeywell International Inc., Morristown, NJ (US)

( * ) Notice: Subject to any disclaimer, the term of this patent is extended or adjusted under 35 U.S.C. 154(b) by 647 days.

(21) Appl. No.: 11/343,540

(22) Filed: Jan. 31, 2006

(65) Prior Publication Data
US 2007/0152053 A1    Jul. 5, 2007

Related U.S. Application Data

(60) Provisional application No. 60/755,628, filed on Dec. 30, 2005.

(51) Int. Cl.
*H04B 1/38* (2006.01)
(52) U.S. Cl. .............................. 375/219; 455/73; 710/1
(58) Field of Classification Search ................. 375/219; 455/73; 710/1
See application file for complete search history.

(56) References Cited

U.S. PATENT DOCUMENTS

| | | | | |
|---|---|---|---|---|
| 5,842,118 | A * | 11/1998 | Wood, Jr. ..................... | 455/101 |
| 5,952,922 | A * | 9/1999 | Shober ..................... | 340/572.4 |
| 6,130,602 | A * | 10/2000 | O'Toole et al. .......... | 340/10.33 |
| 6,150,948 | A * | 11/2000 | Watkins .................... | 340/693.3 |
| 6,820,561 | B2 * | 11/2004 | Soldavini et al. ......... | 104/88.04 |
| 2002/0038267 | A1 | 3/2002 | Can et al. | |
| 2006/0065489 | A1 * | 3/2006 | Oh et al. ..................... | 187/284 |

FOREIGN PATENT DOCUMENTS

| | | |
|---|---|---|
| AU | 677393 B3 | 5/1997 |
| WO | WO 00/65551 | 11/2000 |

OTHER PUBLICATIONS

Wooi Gan Yeoh, "A CMOS 2.45-GHz radio frequency identification tag IC with read/write memory", Radio Frequency integrated Circuits (RFIC) Symposium, 2005. Digest of Papers. 2005 IEEE Jun. 12-14, 2005 pp. 365-368.*

Yasuura, "Towards the Digitally Named World—challenges for new social infrastructures based on information technologies", Euromicro Symposium on Digital System Design, 2003, Proceedings, Sep. 1-6, 2003 pp. 17-22.*

* cited by examiner

*Primary Examiner*—Juan A Torres
(74) *Attorney, Agent, or Firm*—Cascio Schmoyer & Zervas (57) ABSTRACT

A micro range RF data transmission system comprising at least one transmitter incorporated in a moving device and at least one receiver positioned along a fixed path that can be aligned to create a data transfer point. The moving device moves along a fixed path. Each of the at least one receiver is positioned along the fixed path such that when the moving device moves along the fixed path, one of the transmitters aligns with one of the receivers creating the data transfer point. The transmitter will only transmit a micro range signal when the transmitter is at the data transfer point. Each receiver includes an electromagnetic shield formed around the perimeter of the receiver to form a directional channel for the micro range signal. A control system is used for controlling an industrial sheet-making device. The control system uses multiple data transfer points as the backbone for bi-directional communication.

19 Claims, 6 Drawing Sheets

MICRO RANGE RADIO FREQUENCY (RF) COMMUNICATIONS LINK

CROSS REFERENCE TO RELATED APPLICATION

The present application claims priority from U.S. Provisional Application No. 60/755,628 filed on Dec. 30, 2005.

BACKGROUND OF THE INVENTION

1. Field of Invention

The invention relates to a communications link and more particularly to a micro range RF communications link between a moving device and at least one access point positioned along a predefined path of motion for the moving device.

2. Description of Related Art

Data communication between various parts or components of an industrial machine or between a plurality of industrial devices is integral to a control and management system for industrial manufacturing. As a result, the type of communications link becomes extremely important. Factors that are considered when selecting a type of communications link are data transmission rate, range, battery life, security, cost, quality of service, and interoperability.

One type of communications links is a wired cable. A cable is attached to each part(s) of the machine and to each machine to facilitate or enable communication. However, the use of cables causes a significant overhead for installation, maintenance and troubleshooting. For example, several of the machine parts are in a difficult location to attach a cable or replace the cable that requires a significant cost for the installation and maintenance. Additionally, as the machine is used, the cables become damaged and must be replaced. The machine(s) must be stopped to replace the cable, causing the manufacturing process to be halted. Further, network routing would require significant overhead and/or a separate device dedicated to control routing communication signals between devices. Additionally, even if only a small section of the cable is damaged, the entire cable will be replaced.

Another type of communications link is a standard wireless antenna. In the last few years, many wireless connectivity standards have emerged. These technologies enable users to connect a wide range of computing and telecommunications devices easily and simply, without the need to buy, carry, or connect cables. These devices have eliminated the need to purchase additional or proprietary cabling to connect individual devices, thus creating the possibility of using mobile data in a variety of applications. There are many standards such as Bluetooth, IrDA, Home RF, and IEEE 802.11.

However, the uncoordinated transmission of wireless signals leads to signal interference. The transmission of control information or data between various moving parts and a central base station requires a long range communications link. However, an industrial environment is very noisy and is rampant with interference by electromechanical devices in the area. Additionally, wireless devices transmitting RF signals in the same area contribute to transmission failures.

Accordingly, there is a need to provide a communications link that overcomes the problem of signal interference, reduces the cost and simplifies the maintenance for the communications link.

BRIEF SUMMARY OF THE INVENTION

Applicant has developed a micro range RF communications link that is used to transmit data from a moving device to an access point or a receiver positioned along a fixed path of motion of the moving device. Each receiver includes a shield that can channel or funnel the transmitted data signal to the receiver to overcome the drawbacks of the prior art by eliminating any interference caused by overlapping radio signal.

Disclosed is a micro range RF data transmission system comprising at least one transmitter incorporated in a moving device, and at least one receiver positioned along a fixed path. The moving device moves along a fixed path. Each of the at least one receiver is positioned along the fixed path such that when the moving device moves along the fixed path and is positioned proximate to one of the at least one receiver, one of the at least one transmitter aligns with the one of the at least one receiver creating a data transfer point. When the one of the at least one transmitter is at the data transfer point, the one of the transmitters transmits a micro range signal to the one of the receivers.

The micro range RF data transmission system further includes at least one receiver incorporated into the moving device and at least one transmitter positioned along the fixed path. Each transmitter(s) is positioned along the fixed path such that when the at least one receiver in the moving device is proximate to each transmitter(s), each of the one of the at least one receiver in the moving device aligns with one of the at least one transmitter creating a reverse data transfer point. The data transfer point and the reverse data transfer point allow for a simultaneous bi-directional data transfer between the fixed path and the moving device.

Each transmitter in the micro range RF data transmission system transmits the micro range signal over a distance less than a predetermined value.

Each receiver in the micro range RF data transmission system includes an electromagnetic shield formed around a perimeter of each receiver. The electromagnetic shield acts as a chamber that channels the micro range signal from each transmitter to each receiver when a transmitter is at a data transfer point to avoid interference.

Each transmitter has a corresponding control section that includes an alignment sensor. The alignment sensor senses when each transmitter is proximate to a receiver. The alignment sensor outputs a control signal that allows the transmitter to transmit the micro range signal when the alignment sensor detects that the transmitter is proximate to a receiver and is at the data transfer point.

Also disclosed is a control system used for controlling an industrial sheet-making device. The control system comprises a scanned product under manufacture, a moving scanner head with a plurality of sensing devices, each sensing device includes a receiver and a transmitter and a scanner frame which controls and limits motion of the moving scanner head, the scanner frame includes a plurality of receivers and transmitters. Each receiver and transmitter is positioned along the scanner frame such that each receiver and transmitter are capable of aligning with the transmitter and receiver in said sensor, respectively, when the moving scanner head moves proximate to each of the receivers on the scanner frame. The sensor acquires data regarding the scanned products as the moving head moves along the frame over the scanned product. The sensor transmits the acquired data to the scanner frame when the transmitter in the sensor aligns with one of the receivers in the scanner frame. The acquired data is then transmitted to a central collection device for processing.

The scanner frame transmits control information to the moving scanner head when one of the at least one transmitters in the scanner frame is aligned with one of the receivers in the moving scanner head. This transmission will occur simultaneously to the transmission of the acquired sensing data from the moving scanner head. The moving scanner head adjusts its operation based upon the received control information.

BRIEF DESCRIPTION OF THE DRAWINGS

These and other features, benefits and advantages of the present invention will become apparent by reference to the following text and figures, with like reference numbers referring to like elements across the views, wherein.

DETAILED DESCRIPTION OF THE INVENTION

Figure 1:
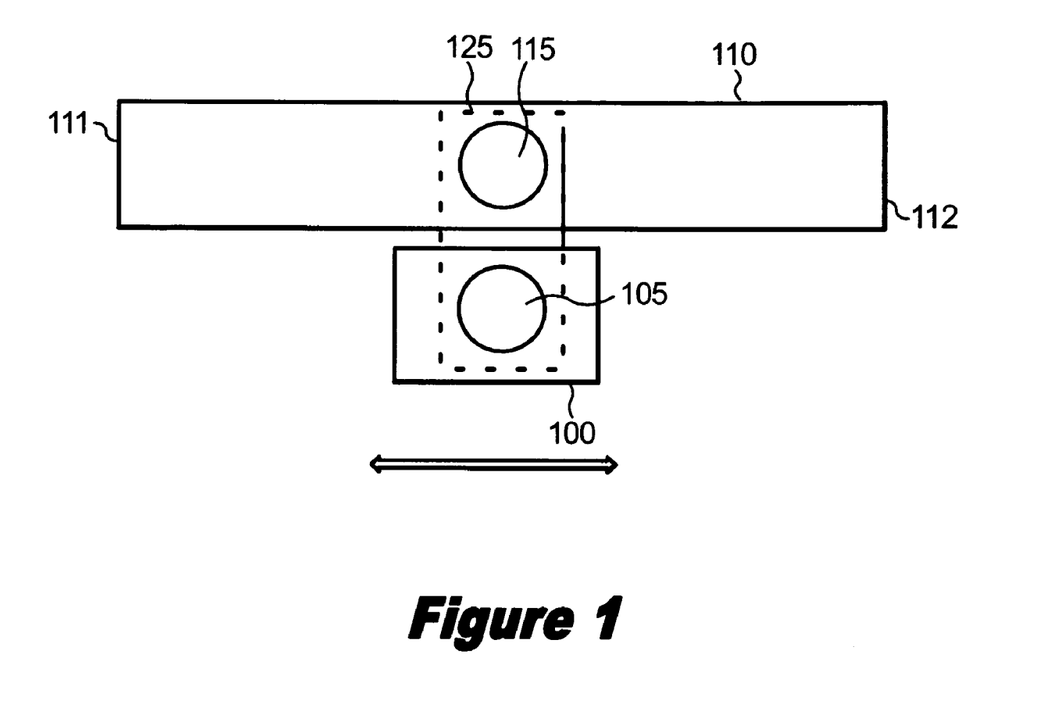
FIG. 1 illustrates a communications system according to a first embodiment of the invention.

FIG. 1 illustrates a micro range RF communications system according to one embodiment of the invention. As depicted in FIG. 1, the system includes a moving device 100 and a path of motion 110 for the moving device with a communication access point. The path of motion 110 is fixed and known. For example, the path of motion 110 can be a device frame, a track, a guide or a rail. The moving device 100 can move in any direction along the path of motion 110. For example, the moving device 100 can move from a front end point 111 to a back end point 112, and vice versa.

The moving device 100 will include a transmitter 105. The transmitter 105 will be a micro range transmitter capable of transmitting data only over a very short distance. The transmission range is a predetermined value the can be set based upon external environmental conditions and specific uses for the system. In one embodiment, the transmission range is between 1-5 mm.

The path of motion 110 will include at least one receiver 115 positioned along the path of motion 110. In one embodiment, a plurality of receivers 115 are positioned or distributed along the path of motion 110. The plurality of receivers 115 can be positioned such that each receiver 115 is equidistant from each other. The receivers 115 act as an access point for data transmission. While FIG. 1 illustrates only one receiver 115, any number of micro range receivers 115 can be positioned along the path of motion 110.

As the moving device 100 moves along the fixed path of motion 110, the transmitter 105 will align with the receiver 115 that is positioned along the path of both. The location of both the receiver 115 and the transmitter 105 within the moving device and path of motion, respectively, is such that the receiver 115 and transmitter 105 can align with each other when the moving device approaches or is proximately to said receiver 115. When the transmitter 105 aligns with the receiver 115, an RF data transfer point 125 is formed.

In a preferred embodiment, data is transferred from the transmitter 105 to the receiver 115 only when they are aligned or in a predetermined proximate distance from each other.

Figure 2:
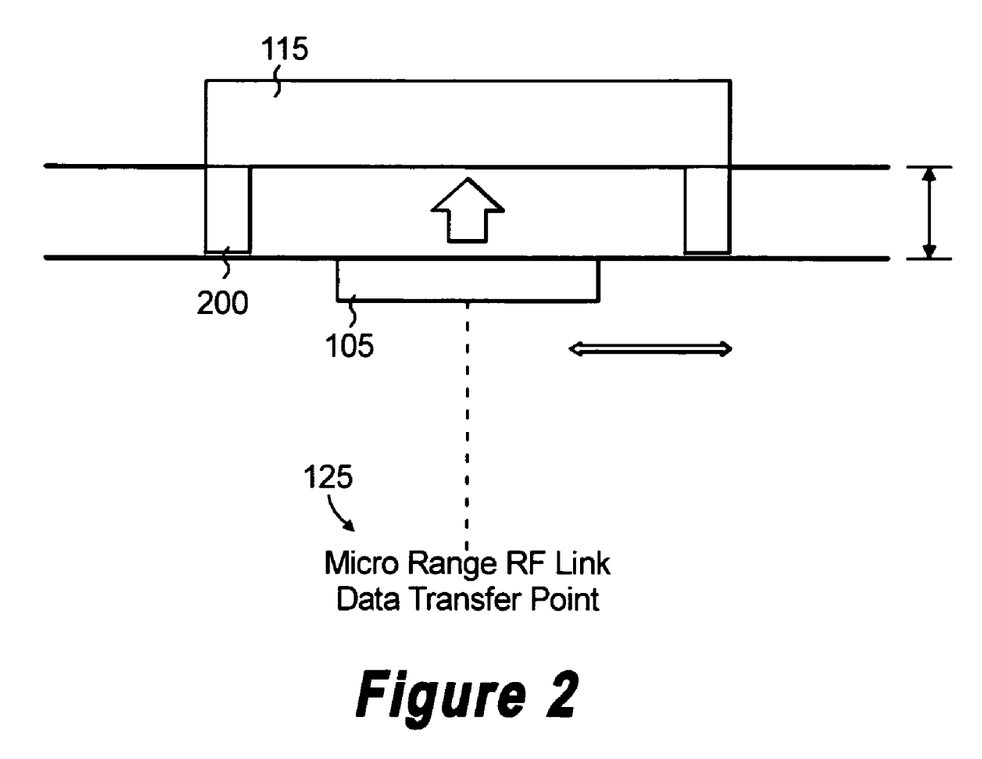
FIG. 2 illustrates a micro RF data transfer link according to one embodiment of the invention.

FIG. 2 illustrates an RF data transfer point 125 according to one embodiment of the invention. The data transfer point 125 includes a receiver 115 and a transmitter 105 that is aligned with the receiver 115. The receiver 115 includes an electromagnetic shield 200 formed around the circumference or perimeter of the receiver 115. In one embodiment, the receiver 115 is a round or elliptical metallic object. In another embodiment, the receiver is a rectangular metallic object. Alternatively, the receiver 115 can be any shape capable of focusing or receiving RF signals. However, no matter what the shape of the receiver 115 is, the electromagnetic shield 200 will be formed around the perimeter of the receiver 115.

The electromagnetic shield 200 forms a chamber for the RF data transfer point 125. The electromagnetic shield 200 in effect channels directional transmission of the data from the transmitter 105 to the receiver 115. The electromagnetic shield 200 further isolates the RF data transfer point 125 from any noise or interference that could occur due to other radio signals and devices within the transmission environment. Additionally, the electromagnetic shield 200 isolates the RF data transfer point 125 from other data transfer points 125 within the system. As depicted in FIG. 2, the distance between the moving device's transmitter 105 and the receiver 115 is between 1-5 mm. In a preferred embodiment, the electromagnetic shield 200 is positioned and dimensioned to cover substantially the entire distance between the transmitter 105 and the receiver 115. The only limitation to the dimension of the electromagnetic shield 200 is that the electromagnetic shield 200 must not interfere with the motion of the moving device 100. The electromagnetic shield 200 can be constructed or fabricated from any material that blocks any RF signal.

In a preferred embodiment, the diameter of the receiver 115 is larger than the diameter of the transmitter 105. This is to ensure that the entire transmitter can be within the enclosed shielded chamber when transmitting the signal and to allow for the entire packet to be transmitting when the transmitter is completely enclosed. The entire surface of the smaller transmitter will be able to travel within the shielded chamber for a time long enough to transmit all of the data. This larger diameter will prevent data from being transmitted to the outside that might have occurred due to constant motion of the device and that the time it takes for the data transmission to occur is greater than zero. The actual diameter or length of the transmitters 105 and receivers 115 will vary based upon external environment conditions and specific uses for the system. Additionally, the diameter or length will be determined based upon a rate of data transmission, size of the packet, and speed of the moving device 100.

Figure 3:
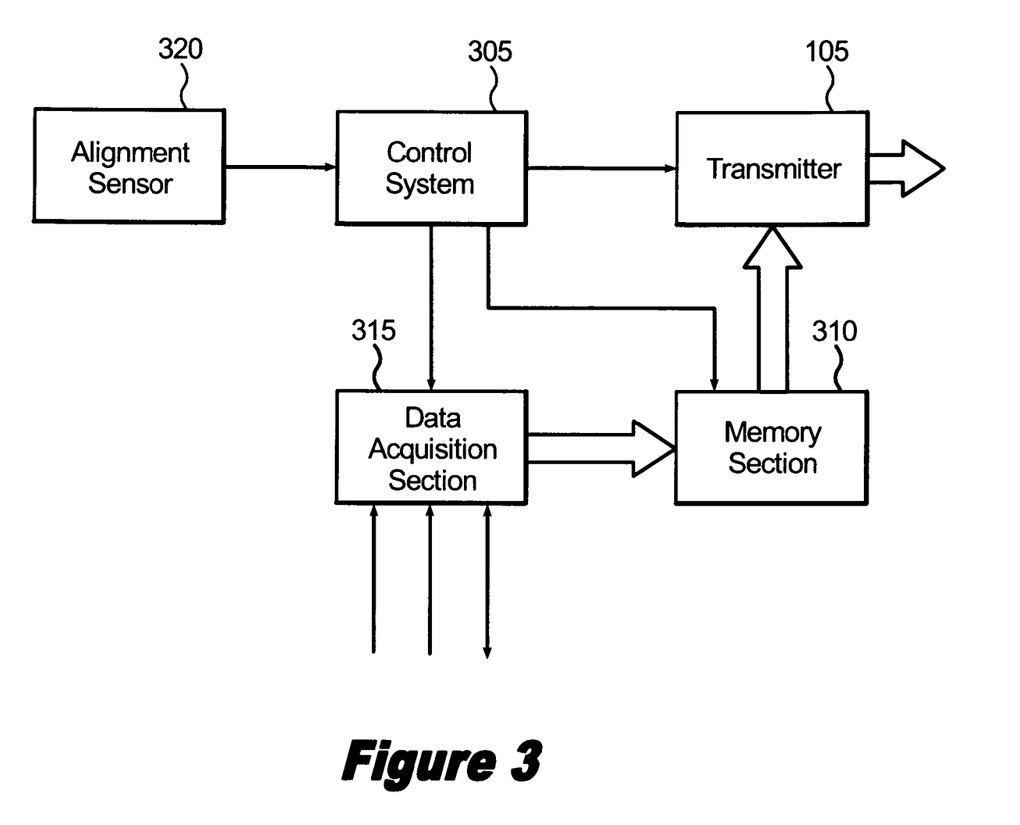
FIG. 3 illustrates a portion of the controller for the moving device's transmitter and data acquisition section according to one embodiment of the invention.

FIG. 3 illustrates a portion of the control section for the data acquisition and transmission section, the data acquisition section 315 and transmitter 105 for the moving device 100 according to one embodiment of the invention. The control section 300 will include a control system 305, a memory section 310, and an alignment sensor 32b. As the moving device 100 moves along its fixed path of motion 110, the moving device 100 will acquire data via the data acquisition section 315. The data acquisition section 315 is controlled by the control system 305. The acquired data is stored in the memory section 310 for a short period of time. The period of time is determined by the speed of the moving device 100 and distance to the next RF data transfer point 125, since the transmitter 105 only transmits the data when the transmitter 105 is aligned with the receiver 115.

The alignment sensor 320 is used to detect when the transmitter 105 is aligned with the receiver 115. In one embodiment, the receiver 115 will include a permanent magnetic embedded, implanted or attached to it. The transmitter 105 will include a magnetic field sensor, which will output signal when the permanent magnetic is aligned with the magnetic field sensor. The output signal can be a logic signal. The logic signal will be used to drive the transmitter 105. In another embodiment of the invention, the receiver 115 can include a channeled light source, e.g., laser and the transmitter 105 can include a light detector. The light detected will output a signal when the light is detected, e.g., logic signal, the signal will be used to drive the transmitter 105. If alignment sensor 320 determines that the transmitter 105 is aligned with the receiver 115 it will allow the transmitter 105 to transmit the data. All of the acquired data that was stored in the memory section 310 will be transmitted in a bulk transmission, i.e., a periodic dump. Alternatively, if the alignment sensor 320 determines that the transmitter 105 is not aligned with the receiver, then the acquired data will not be transmitted; the acquired data will be stored in the memory section 310.

Figure 4:
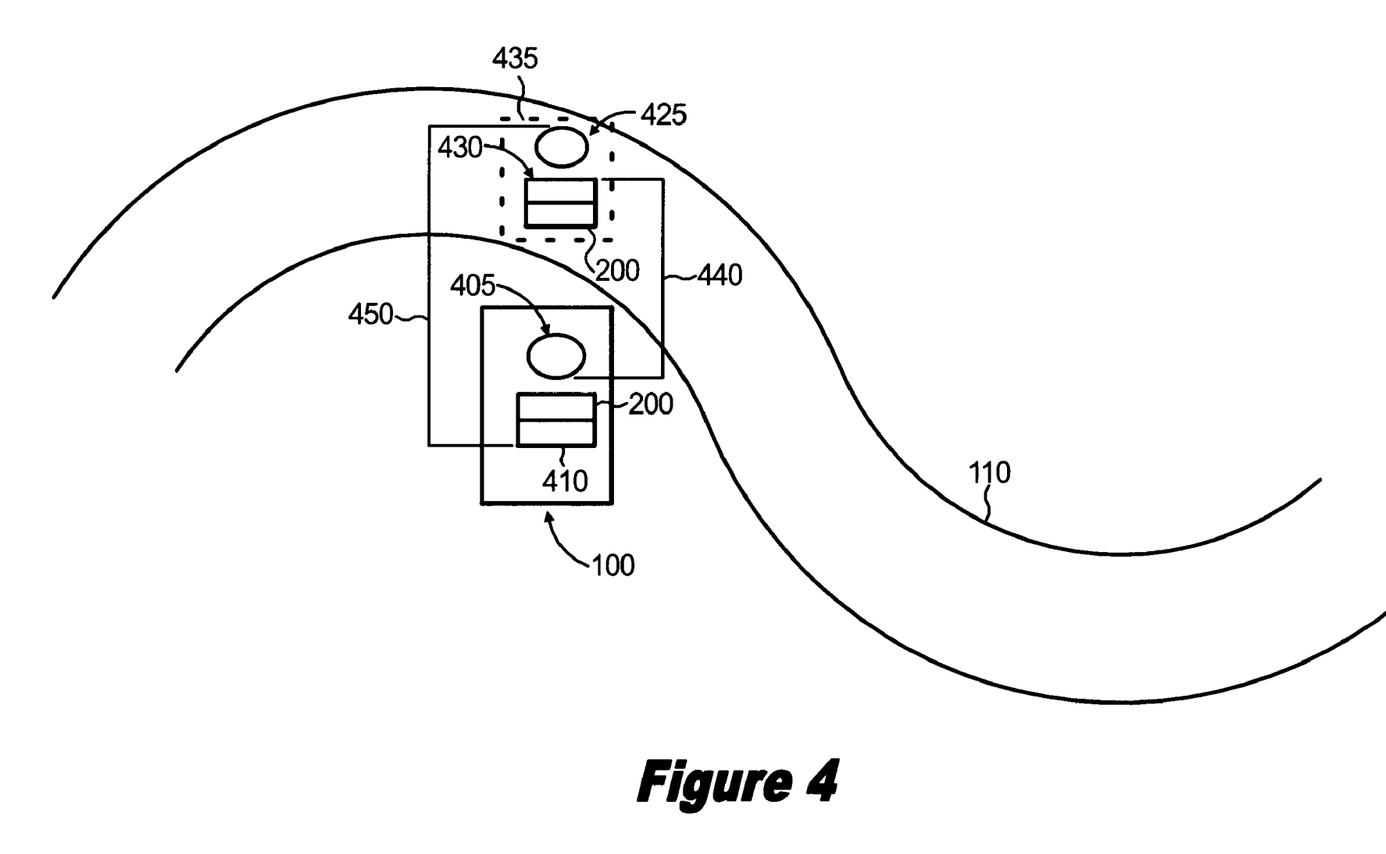
FIG. 4 illustrates a communications system according to a second embodiment of the invention.

FIG. 4 illustrates a second embodiment of the invention. According to the second embodiment of the invention, a first and second RF data transfer point is used to effect a bi-directional communication between the moving device 100 and the path of motion 110 as opposed to the uni-directional transmission, as depicted in FIG. 1.

According to the second embodiment, the moving device 100 includes both at least one transmitter 405 and at least one receiver 410. The at least one transmitter 405 and at least one receiver 410 is positioned within the moving device 100 to align with a receiver and transmitter, respectively, located on the path of motion 110, as will be described later.

Similar to receiver 115, each receiver 410 will have an electromagnetic shield 200 formed at the perimeter or circumference of the receiver 410. The electromagnetic shield 200 is similar to the electromagnetic shield 200 as set forth above with respect to the first embodiment and, therefore, will not be described again. The path of motion 110 includes at least one transmitter 425 and receiver 430. All receivers 430 will include the electromagnetic shield 200. Each receiver 430 and transmitter 425 combination creates a transmission pair 435 and is positioned proximate to each other to facilitate simultaneous transmission with the receiver 410 and the transmitter 405. Each transmission pair 435 is positioned along the path of motion 110 such that the pair can be simultaneously aligned with the moving device's receiver 410 and transmitter 405. When the moving device's receiver 410 and transmitter 405 are aligned with or in a defined proximate distance with the transmission pair 435, a first and second data transfer point 440 and 450 is established. Transmitter 405 and receiver 430 form the first data transfer point 440. The first data transfer point 440 is similar to the data transfer point 125 (FIG. 2) and facilitates data transmission from the moving device 100 to the path of motion 110.

The second data transfer point 450 is formed from receiver 410 and transmitter 425. The second data transfer point 450 facilitates data transmission from the path of motion 110 to the moving device 100. This is particularly useful to transmit control information to the moving device.

Similar to the first embodiment, the moving device will only transmit a signal when the transmitter 405 is aligned with the receiver 430. However, in the second embodiment, there is a simultaneous bi-directional transmission between the moving device 100 and the path of motion 110 using the first and second data transfer points 440 and 450. Each data transfer point (440 and 450) facilitates one direction of the bi-directional data transfer.

Figure 5:
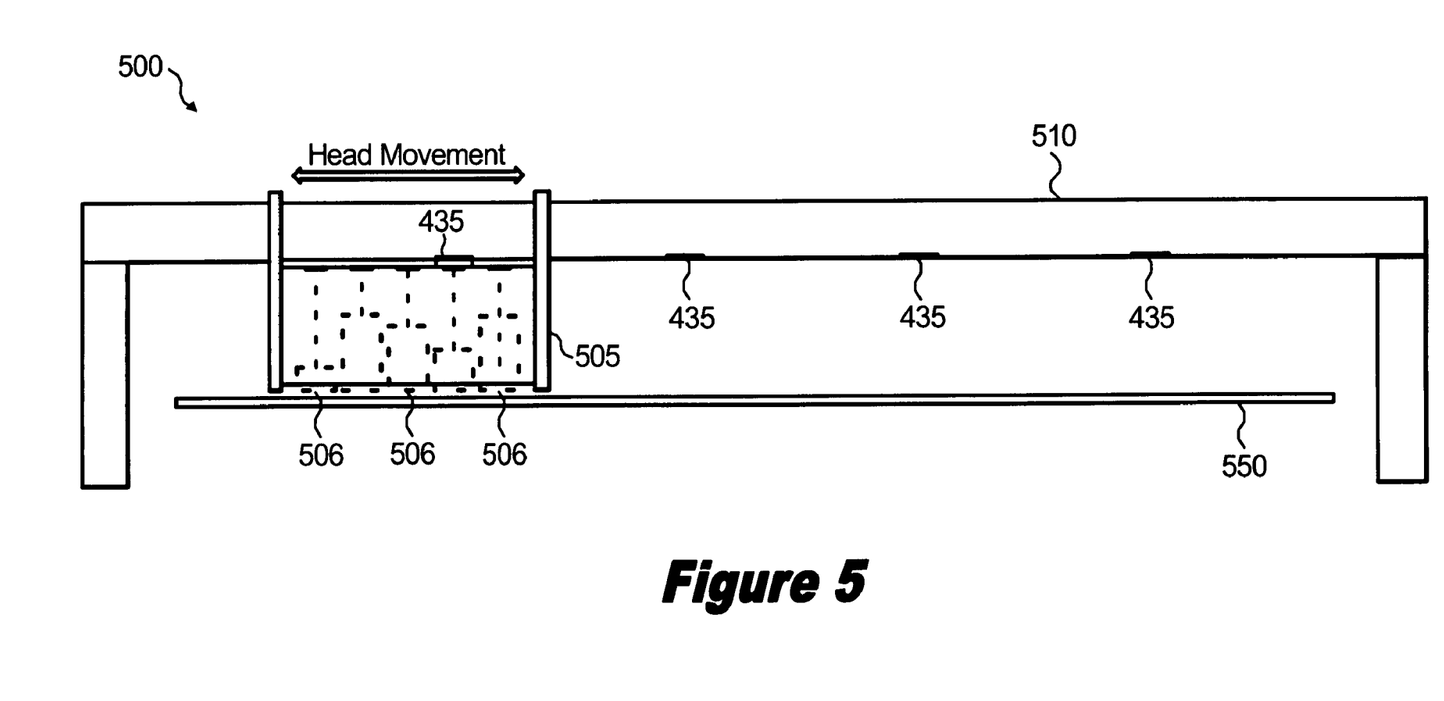
FIG. 5 illustrates a side view of a scanner device that is implementing the communications system, according to the second embodiment of the invention, as a control system.
Figure 6:
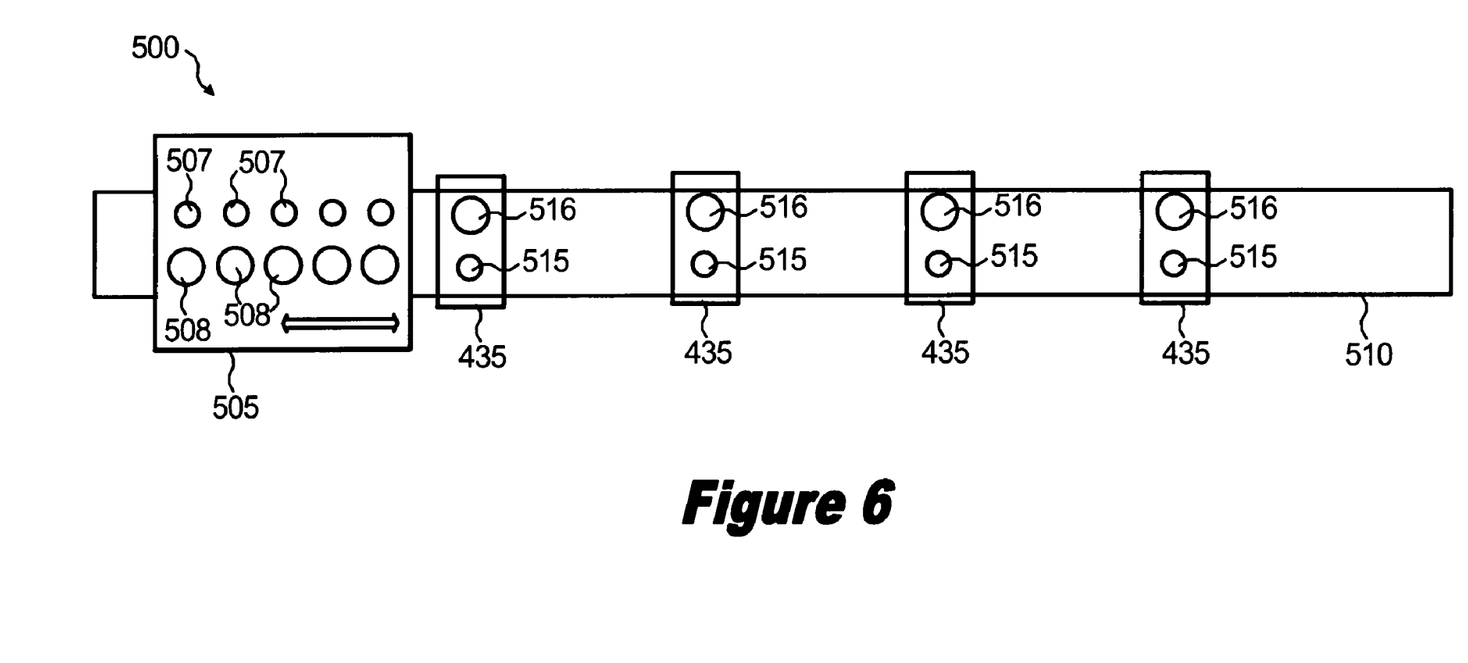
FIG. 6 illustrates a top view of the scanner device.

FIGS. 5 and 6 illustrate an example of the micro range RF communication link according to the second embodiment of the invention to transmit sensor data and control messages to and from a scanner device.

FIG. 5 illustrates a side view of an industrial scanning device 500 having a plurality of micro range RF communication links. FIG. 6 illustrates a top view of the scanner frame 510 and scanning head 505.

In industrial processing, a plurality of scanning devices 500 is used to measure properties of a manufactured product. These scanning devices 500 are particularly used in the sheet making industry. A sheet making machine such as a paper making machine uses the plurality of scanning devices 500 distributed along the web of the paper to measure and acquire data about the various properties of the paper web under manufacture. These measured properties are transmitted to a central collection device where processing and control parameters are fedback to a plurality of actuators that control the manufacturing process. Additionally, control parameters are also fedback to the scanning device 500. The scanning devices 500 are arranged or positioned along the assembly line that extends from a stock tank containing raw stock to a reel of finished paper products.

The scanning device 500 includes a moving scanning head 505 and a fixed scanner frame 510. The scanning head 505 includes a plurality of sensing devices 506. The sensing devices are used to acquire data from a scanned product 550. Each of the plurality of sensing devices 506 includes a sensor transmitter 507 and receiver 508, as depicted in FIG. 6. The scanning head 505 is capable of moving in multiple directions; however, its range of motion is fixed and governed by the scanner frame 510. Typically, the scanner head 505 will move in a linear direction across the scanned product 550 and acquired data regarding the scanned product 550 as the scanner head 505 moves across the scanned product 550.

The scanner frame 505 includes a plurality of transmission pairs 435 distributed along the scanner frame 505. As depicted in FIG. 6, each transmission pair 435 includes a frame transmitter 515 and a frame receiver 516.

As the scanning head 505 moves along the scanning product 550, each sensor 506 acquires data and briefly stores the data in memory. The accumulated data is transmitted from the sensors 506 to the scanner frame 510 when its transmitter 507 is aligned with the frame receivers 516. Each data transfer point has an alignment sensor that detects alignment.

All of the frame receivers 516 are connected to a central collection device via a network. The frame receivers 516 will periodically transmits the acquired data from the sensors 505 to the central collection device. The central collection device will store and process the acquired data and transmit control parameters to the scanner frame 510. The frame transmitters 515 will transmit these control parameters to the sensors 506 using one of the data transfer points.

When one of the alignment sensors detects alignment between one of the sensor transmitters 507 and frame receivers 516 or between one of the sensor receivers 508 and the frame transmitter 515, there will be simultaneous transmission of data to and from the sensors 506 and the fixed scanner frame 510. In one direction, the sensors 506 will transmit, using the sensor transmitter 507 the acquired data to the fixed scanner frame, in the other direction, the fixed scanner frame 510, using the frame transmitter 515, will transmit control data to the sensing devices.

The above description and drawings are given to illustrate and provide examples of various aspects of the invention, and is not intended to limit the invention to the examples or illustrations. Given the benefit of the above disclosure, those skilled in the art may be able to devise various modifications and alternate constructions that, although differing from the examples disclosed herein, nevertheless enjoy the benefits of the invention and fall within the scope of the invention.

What is claimed is:

1. A micro range RF data transmission system comprising:
at least one transmitter incorporated in a moving device, said moving device moves along a fixed path; and
at least one receiver positioned along said fixed path such that when said moving device moves along the fixed path and is positioned proximate to one of the at least one receiver, one of said at least one transmitter aligns with said one of the at least one receiver creating a data transfer point, when said one of said at least one transmitter is at said data transfer point, said one of said at least one transmitter transmits a micro range signal to said one of said at least one receiver, said micro range signal cannot be detected outside a micro range, wherein at least one receiver is incorporated into said moving device and at least one transmitter is positioned along said fixed path, said at least one transmitter is positioned along said fixed path such that when said at least one receiver in said moving device is proximate to one of said at least one transmitter, said one of said at least one receiver in said moving device aligns with said one of said at least one transmitter creating a reverse data transfer point, said data transfer point and said reverse data transfer point allow for a simultaneous bi-directional data transfer between the fixed path and the moving device.

2. The micro range RF data transmission system of claim 1, wherein each of said at least one transmitter is positioned along said fixed path proximate to a corresponding one of said at least one receiver on said fixed path.

3. The micro range RF data transmission system of claim 2, wherein each of said at least one receiver and transmitter is further positioned along said fixed path such that said each of said at least one transmitter and its corresponding one of said at least one receiver is aligned relative to each other such that both will align simultaneously with the at least one receiver and transmitter located in the moving device, respectively, when the moving device moves proximate to one of the at least one transmitter and receiver in the fixed path.

4. The micro range RF data transmission system of claim 1, wherein said moving device is an industrial scanning device with a sensor and the fixed path is a scanner frame, the sensor includes both the at least one transmitter and receiver, said sensor acquires data and the acquired data is transmitted to the scanner frame when the sensor is positioned at the data transfer point, which is created from the at least one transmitter in the sensor and the at least one receiver in the scanner frame.

5. The micro range RF data transmission system of claim 1, wherein said at least one transmitter transmits the micro range signal over a distance less than a predetermined value.

6. The micro range RF data transmission system of claim 5, wherein said predetermined value is between 1-5 mm.

7. The micro range data transmission system of claim 1, wherein each of said receivers has a relative diameter greater than each of said transmitters.

8. The micro range data transmission system of claim 1, wherein each of said at least one receivers includes an electromagnetic shield formed around a perimeter of each of said at least one receivers, the electromagnetic shield acts as a chamber that channels the micro range signal from the one of said at least one transmitters to each receiver when said one of said at least one transmitters is at the data transfer point to avoid interference.

9. A micro range RF data transmission system comprising:
at least one transmitter incorporated in a moving device, said moving device moves along a fixed path; and
at least one receiver positioned along said fixed path such that when said moving device moves along the fixed path and is positioned proximate to one of the at least one receiver, one of said at least one transmitter aligns with said one of the at least one receiver creating a data transfer point, when said one of said at least one transmitter is at said data transfer point, said one of said at least one transmitter transmits a micro range signal to said one of said at least one receiver, said micro range signal cannot be detected outside a micro range, wherein each transmitter has a corresponding control section that includes an alignment sensor, said alignment sensor senses when one of said each transmitter is proximate to one of said at least one receiver, said alignment sensor outputs a control signal that allows each transmitter to transmit the micro range signal when said alignment sensor detects that each transmitter is proximate to one of said at least one receiver and is at the data transfer point.

10. The micro range RF data transmission system of claim 9, wherein when said alignment sensor detects that one of said at least one transmitter is not located proximate to one of said at least one receiver on said fixed path, the moving device accumulates data as said moving device moves along said fixed path and stores the data in memory.

11. The micro range RF data transmission system of claim 9, wherein said at least one transmitter transmits the micro range signal over a distance less than a predetermined value.

12. The micro range RF data transmission system of claim 11, wherein said predetermined value is between 1-5 mm.

13. The micro range data transmission system of claim 9, wherein each of said at least one receivers includes an electromagnetic shield formed around a perimeter of each of said at least one receivers, the electromagnetic shield acts as a chamber that channels the micro range signal from the one of said at least one transmitters to each receiver when said one of said at least one transmitters is at the data transfer point to avoid interference.

14. A micro range RF data transmission system comprising:
at least one transmitter incorporated in a moving device, said moving device moves along a fixed path; and
at least one receiver positioned along said fixed path such that when said moving device moves along the fixed path and is positioned proximate to one of the at least one receiver, one of said at least one transmitter aligns with said one of the at least one receiver creating a data transfer point, when said one of said at least one transmitter is at said data transfer point, said one of said at least one transmitter transmits a micro range signal to said one of said at least one receiver, said micro range signal cannot be detected outside a micro range, wherein each of said at least one receivers includes an electromagnetic shield formed around a perimeter of each of said at least one receivers, the electromagnetic shield acts as a chamber that channels the micro range signal from the one of said at least one transmitters to each receiver when said one of said at least one transmitters is at the data transfer point to avoid interference.

15. The micro range data transmission system of claim 14, wherein said electromagnetic shield is dimensioned substantially an entire distance between a corresponding receiver and transmitter at a transfer point.

16. The micro range RF data transmission system of claim 14, wherein said at least one transmitter transmits the micro range signal over a distance less than a predetermined value.

17. The micro range RF data transmission system of claim 16, wherein said predetermined value is between 1-5 mm.

18. A control system used for controlling an industrial sheet making device comprising:
a scanned product under manufacture; a moving scanner head with a plurality of sensing devices, each sensing device includes a receiver and a transmitter; and
a scanner frame which controls and limits motion of the moving scanner head, said scanner frame includes a plurality of receivers and transmitters positioned along the scanner frame such that one receiver and transmitter of the plurality of receivers and transmitters aligns with the transmitter and receiver in said sensor, respectively, when said moving scanner head moves proximate to one of the receivers on the scanner frame, wherein said sensor acquires data regarding the scanned products as the moving head moves along the frame over the scanned product and transmits the acquired data to said scanner frame when said transmitter in said sensor aligns with said receiver in the scanner frame, the acquired data is then transmitted to a central collection device for processing.

19. The control system according to claim 18, wherein said scanner frame transmits control information to said moving scanner head when one of said at least one transmitters in said scanner frame is aligned with one of said receivers in said moving scanner head, said moving scanner head adjusts its operation based upon the received control information.

* * * * *